(12) United States Patent
Tateishi et al.

(10) Patent No.: US 6,791,916 B2
(45) Date of Patent: Sep. 14, 2004

(54) SERVO CONTROL APPARATUS FOR OPTICAL DISC DRIVER

(75) Inventors: Kiyoshi Tateishi, Tsurugashima (JP); Kazuo Takahashi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 588 days.

(21) Appl. No.: 09/879,249

(22) Filed: Jun. 12, 2001

(65) Prior Publication Data

US 2001/0055247 A1 Dec. 27, 2001

(30) Foreign Application Priority Data

Jun. 23, 2000 (JP) .................................... P2000-188867

(51) Int. Cl.[7] ................................................ G11B 7/00
(52) U.S. Cl. ............................... 369/44.32; 369/44.34; 369/53.15
(58) Field of Search .......................... 369/44.26, 44.27, 369/44.28, 44.29, 44.32, 53.15, 53.12, 53.18, 44.34

(56) References Cited

U.S. PATENT DOCUMENTS 6,259,664 B1 * 7/2001 Kwag ...................... 369/53.15

* cited by examiner

*Primary Examiner*—Nabil Hindi
(74) *Attorney, Agent, or Firm*—Ladas & Parry

(57) ABSTRACT

A servo control apparatus is provided to a stable servo control even when delays occur in detecting defects. Based on reflected light of an optical beam from an optical disc, a defect resulting from dark spots, damages, or others on the optical disc is detected. Immediately before the detection, sample data of a control signal are memorized. The sample data are obtained during a predetermined interval of time that corresponds to a detection delay for the defects, which is dependent on a defect detecting device. Using the memorized sample data, a cancel signal is produced for canceling the influence of the control signal, which is owing to a pseudo error signal obtained during the predetermined interval of time. The cancel signal is outputted as the control signal immediately after the detection of the defect.

10 Claims, 15 Drawing Sheets

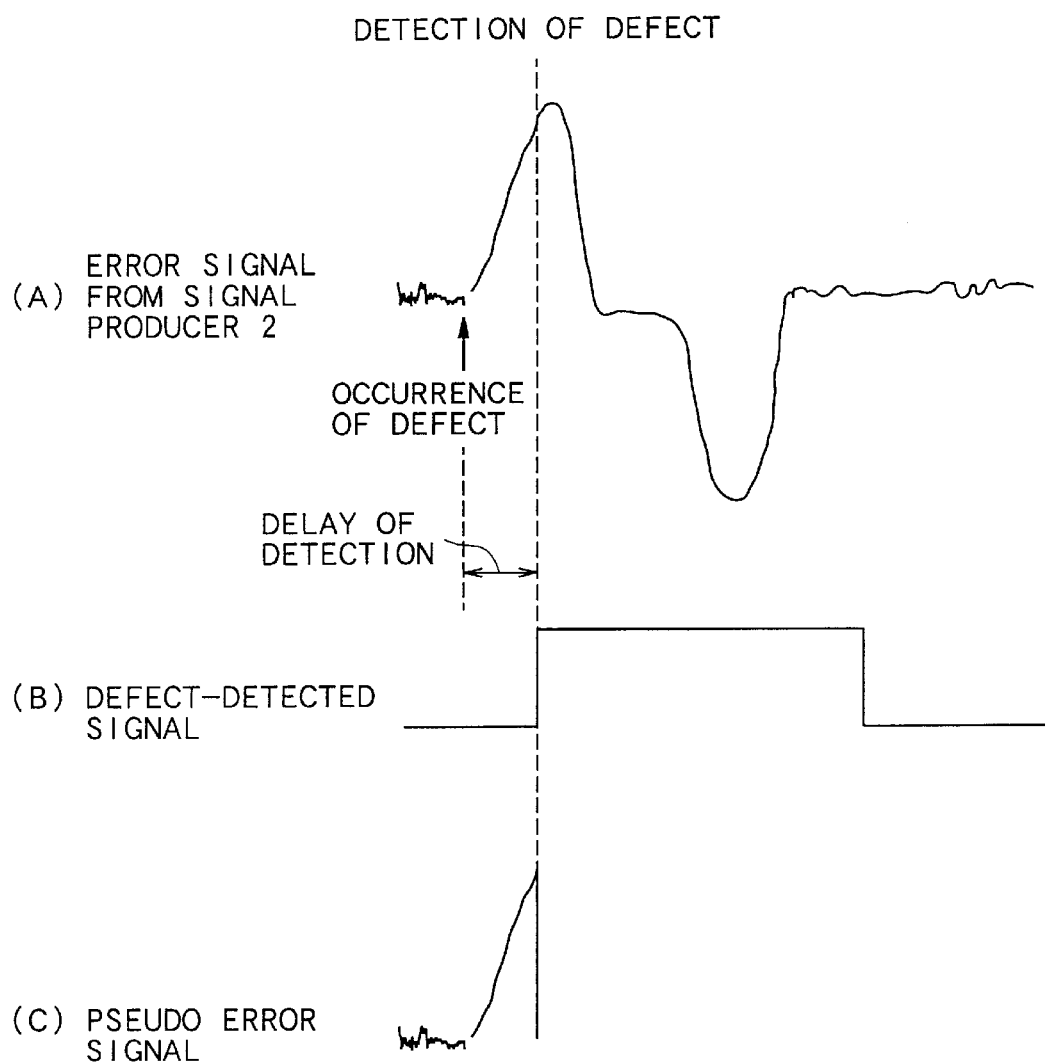

SERVO CONTROL APPARATUS FOR OPTICAL DISC DRIVER

BACKGROUND OF THE INVENTION

The present invention relates to a servo technique used for a servo control apparatus incorporated in an optical disc driver.

In devices capable of recording and reproducing information into and from discs, such as CDs (Compact Discs), DVDs (Digital Video Discs), or LDs (Laser Discs), a tracking servo mechanism or focus servo mechanism is required to read out accurately information from information tracks (recorded tracks) of their optical discs. In cases there are obstacles including dark spots, damages or contaminants on the information tracks of the optical disc and a light beam passes across such dark spots, damages or contaminants, a defect occurs in its returned light. Accordingly an input signal obtained from an optical pickup detecting the returned light includes the defect as well. If the defect occurs, a servo error (tracking error (TE) or focus error (FE)) does not indicate its appropriate value during a period of detecting the defect. This inappropriate value of the error signal is known as a "pseudo error." When an actuator is driven based on the pseudo error, a servo operation is disturbed undesirably.

To overcome this situation, a conventional servo control apparatus comprises a device for detecting defects included in the input signal obtained by an optical pickup and a device for preventing the foregoing drawback responsively to a signal detected by a detecting device. More specifically, when a defect is detected, an error signal, which corresponds to an amount displaced from a target value during a normal operation, is replaced by an error signal obtained immediately before the occurrence of a defect (pre-holding) or a low-frequency component of the error signal (integrated signal). This displaced signal is outputted as an alternative servo control signal, with the result that a positional displacement caused by a pseudo error signal (that is, a signal that is not responsible for a displacement from a target value) is lowered.

The defect is found by detecting the fact that the envelope level of an RF signal becomes smaller than a reference level. If irradiated light is scattered by a dark spot, damage, or contaminant on the optical disc, its returned light is reduced in its intensity. As a result, the defect detection causes an inconvenience. Namely, since the envelope level is compared with a certain reference level, the detection that a defect occurs is finally made after the envelope has reduced down to a level smaller than the reference level.

This means that, during an interval starting from the start of the envelope level reduction to the reach of the envelope level to a reference level, a defect will not be detected, even though the defect has already occurred. During such a duration from the occurrence of a defect to the detection thereof (hereafter, called "detection delay time"), a servo control apparatus is obliged to control its servo mechanism based on an error signal affected by the defect. This control urges the optical beam to be moved with an accelerated operation, so that there is a possibility that the optical beam is displaced largely by mistake from a target position.

To reduce such a detection delay time can be realized by increasing the reference level, i.e., raising detection sensitivity of defects. However, raising the detection sensitivity tends to over-detection, which detects even noise which should be ignored as accurate as possible when detecting the signal. The over-detection may bring about interruptions of feedback control conducted based on an error signal originally acquired, which frequently disturbs servo operations. Moreover, because the envelope of the input signal is obtained through LPF processing of the RF signal thereof, a phase shift (phase delay) owing to a phase characteristic of the LPF also results in the detection delay. Influences of the detection delay become larger as a servo band is widened as accuracy required for the servo control is raised.

SUMMARY OF THE INVENTION

The present invention has been made with consideration of the foregoing inconveniences that the conventional servo control apparatus has, and an object of the present invention is to provide a servo control apparatus for optical disc drivers, which is able to control servo operations in a stable manner even when defects are detected with delays.

To realize the above object, there is provided a servo control apparatus for an optical disc driver, in which a control signal assigned to a displacement amount of an optical beam from a target value is used to drive an actuator for controlling a position of the optical beam on an optical disc, comprising: a defect detecting device for detecting a defect on the basis of reflected light of the optical beam from the optical disc; a storing device for storing sample data of the control signal obtained during a predetermined interval corresponding to a detection delay of the defect due to at least the defect detecting device on the basis of sample values of the control signal inputted at predetermined sampling intervals; a cancel signal producing device for producing a cancel signal to cancel influences of the control signal obtained during the predetermined interval on the basis of the stored sample data; and an outputting device for outputting the cancel signal as the control signal immediately after the detection of the defect.

According to this configuration, defects occurring on account of dark spots, damages or others on the optical disc are detected from reflected light of an optical beam from the optical disc. Immediately before this detection, sample data of a control signal which are acquired during a predetermined interval of time are memorized. The interval corresponds to a detection delay of the defect-detecting device. Based on the memorized sample data, a cancel signal is produced. The cancel signal is required to cancel influences of the control signal resulted from a pseudo error signal obtained during the above predetermined interval. Immediately after the detection of a defect, the cancel signal is outputted as the control signal. The control signal based on the pseudo error signal causes a force acting on the actuator in an accelerating direction thereof, and the force, which is due to the delay in detecting the defect, disturbs servo operations. The force is however canceled by a force that is produced by the cancel signal and that acts on the actuator in the decelerating direction. Therefore, the optical beam is prevented from shifting from a target position on the optical disc, which leads to servo control with stability.

Preferably, the cancel signal is opposite in polarity to the control signal stored in the storing device as the sample data and is a pulse signal equal to an integrated value of the sample data.

Still preferably, the cancel signal is smaller in a temporal width than the control signal stored as the sample data in the storing device. Accordingly, immediately after the output of a pseudo control signal derived from a pseudo error signal that disturbs servo operations, the cancel signal thus produced can be added instantaneously. Thus a cancel effect against influences of the control signal derived from the pseudo error signal can be enhanced.

It is preferred that the storing device has a FIFO memory and is configured so as to output the sample data using a function of the FIFO memory, and the cancel signal producing device is configured so as to produce the cancel signal by inverting polarities of the outputted sample data.

It is also preferred that the storing device has a FILO memory and is configured so as to output the sample data using a function of the FILO memory, and the cancel signal producing device is configured so as to produce the cancel signal by inverting polarities of the outputted sample data.

Thus, these configurations enable the control signal based on a pseudo error signal to reproduce from the memory as it is. It is therefore possible to easily produce the cancel signal to cancel, with higher precision, influences of the control signal dependent on the pseudo error signal.

In the two configurations with the FIFO and FILO memories, the servo control apparatus may further comprises a reference signal producing device for producing a reference signal by extracting only a lower frequency component of the control signal, wherein the cancel signal producing device is configured so as to invert the polarities of the sample data outputted from the storing device by using as a reference a voltage level of the reference signal produced by the reference signal producing device. This prevents disturbances on account of the inversion of its polarity from occurring.

In all the above configurations, it is preferred that the control signal is an error signal produced from the reflected light. Alternatively, the control signal may be a drive signal to the actuator. Accordingly, the cancel signal for canceling influences of a pseudo error signal, which are brought about by a detection delay of a defect and disturbs servo operations, can be produced with higher precision.

BRIEF DESCRIPTION OF THE DRAWINGS

In the accompanying drawings:

FIGS. 3(A) to 3(C) exemplify an error signal, defect-detected signal, and pseudo error signal that will be generated at the occurrence of a defect;

DETAILED DESCRIPTION OF THE PREFERRED EMBODIMENTS

With reference to the drawings, preferred embodiments of the present invention will now be explained.

The embodiments explained below are related with a servo control apparatus incorporated in an optical disc reproducing apparatus. In this servo control apparatus, the present invention is applied to a servo mechanism to which the position of a light beam on an optical disc is made to change. The optical disc handled in this embodiment includes a DVD-ROM, DVD-RAM, DVD-RW, and CD-ROM.

Figure 1:
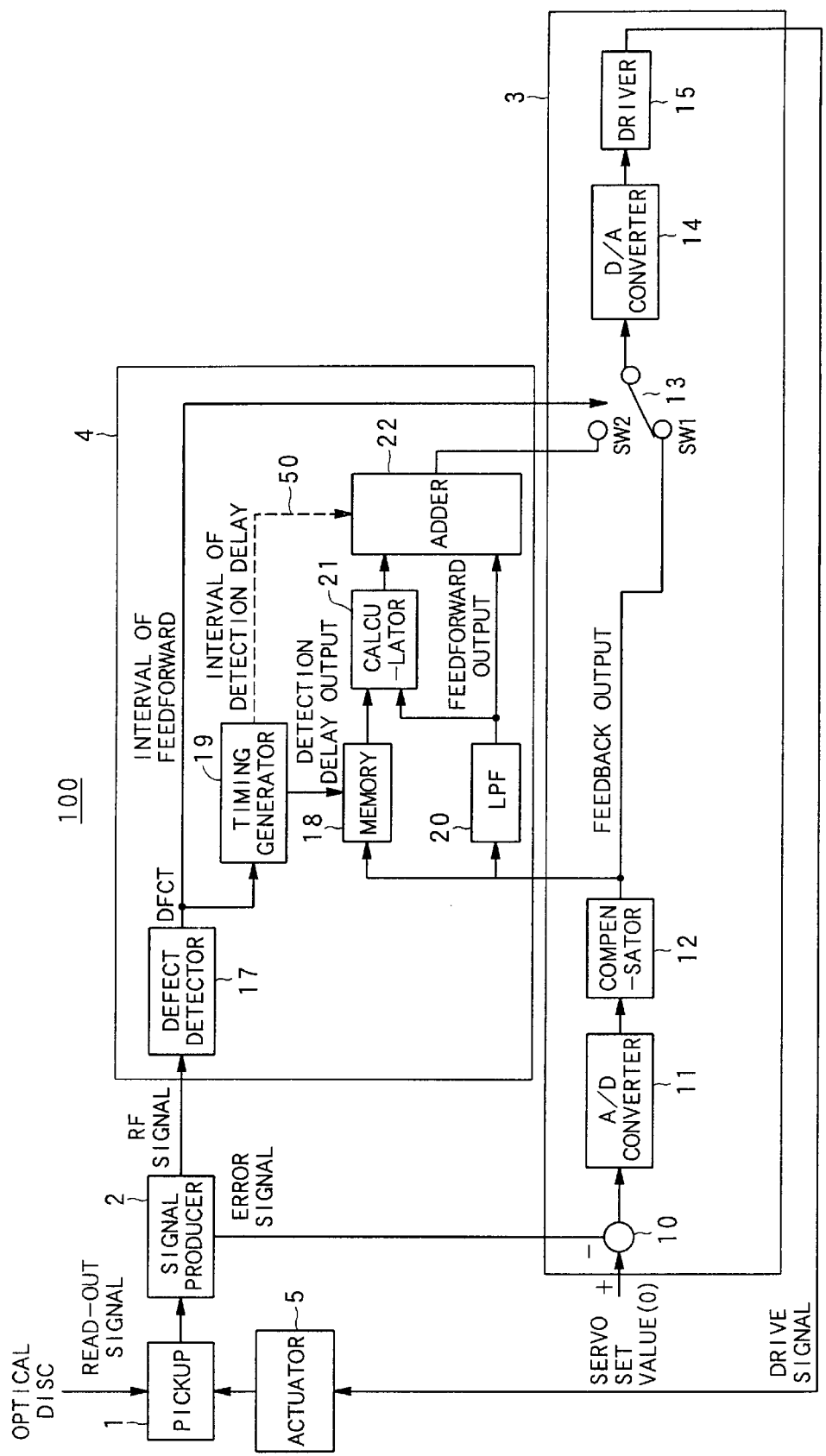
FIG. 1 exemplifies an outlined configuration of a servo control apparatus according to one embodiment of the present invention.

FIG. 1 exemplifies an outlined configuration of a servo control apparatus 100 according to an embodiment, which is incorporated in an optical disc reproducing apparatus.

As shown in FIG. 1, the servo control apparatus 100 is equipped with an optical pickup 1, a signal producer 2, a controller 3, a defect processor 4 and an actuator 5.

The optical pickup 1 is equipped with a photo detector (not shown), which receives reflected light from an optical disc through a lens (not shown). As the photo-detector, a known 4-division type of photo detector is used, for example. The optical pickup 1 is driven controllably by the actuator 5 so that the light beam irradiated from sources of luminescence such as a not-shown laser diode is located on an optical disc in a controlled manner. That is, the actuator 5 changes the position of a light beam on the optical disc responsively to an error signal assigned to an amount of displacement from a target point of the light beam. The signal producer 2, which comprises adders and subtractors (not shown), produces an RF signal and an error signal from a signal outputted from the photo detector. For a tracking servo, the error signal is a tracking error (TE) signal, while for a focus servo, the error signal is a focus error signal (FE) signal.

The controller 3 is equipped with an adder 10, an A/D converter 11, a compensator 12, a selector 13, a D/A converter 14 and driver 15. This controller 3 performs processing, such as phase compensation, low-frequency band boost addition, and others, to the error signal supplied from the signal producer 2, so that a drive signal is produced. Furthermore, based on the drive signal, the controller 3 drives a not-shown objective lens in the optical pickup 1 through the actuator 5 so that the above-mentioned error signal is set to "0."

Thus, a servo loop (closed loop) is formed by the pickup 1, the signal producer 2, the controller 3 and the actuator 5. Such a servo loop is maintained by the selector 13 (switched to its SW1-side) while a defect is not detected. Since such a servo loop is known, its detailed explanation is omitted.

The defect processor 4 that accomplishes one of the features of the present invention will be explained. This defect processor 4 has a defect detector 17, a memory 18, a timing generator 19, a low pass filter (LPF) 20, a calculator 21 and an adder 22, and is responsible for stabilizing a servo mechanism even when a defect has been detected. When a defect occurs as to an RF signal, the defect detector 17 detects this occurrence, generates a defect (DFCT)-detected signal, and outputs this defect-detected signal to both timing generator 19 and selector 13.

Figure 2:
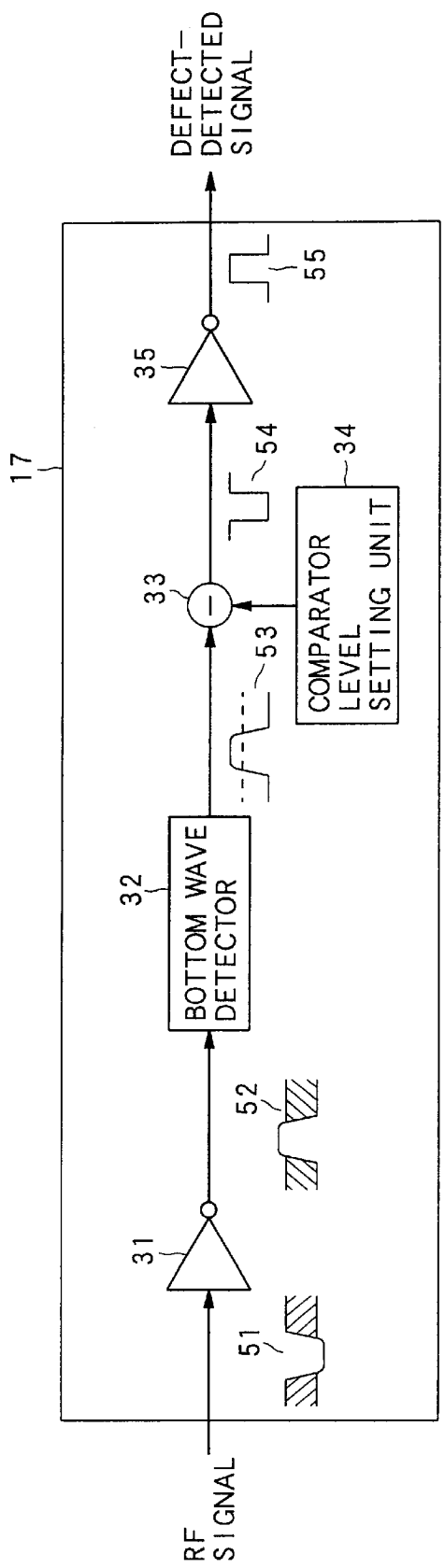
FIG. 2 exemplifies the inner configuration of a defect detector incorporated in the servo control apparatus in the embodiment.

FIG. 2 shows an internal configuration of the defect detector 17. As shown in FIG. 2, the defect detector 17 is equipped with an inverter 31, a bottom wave detector 32, a comparator 33, a comparator level setting unit 34 and an inverter 35. As shown in FIG. 2, when an RF signal 51 in which a defect exists is inputted, the RF signal 51 is inverted by the inverter 31, and supplied as a signal 52 to the bottom wave detector 32. The bottom wave detector 32 detects the signal 52, and outputs to the comparator 33 as a signal 53, which has experienced the detection. A predetermined reference level is supplied to the comparator 33 from the comparator level setting unit 34. Thereby, the comparator 33 outputs a high-level voltage when the detected signal 53 is lower than the reference level, while it outputs a low-level voltage when the detected signal 53 is higher than the reference level. An inverter 35 inverts a signal 54 outputted from the comparator 33, and outputs this inverted signal as a defect (DFCT)-detected signal 55. Thereby, the selector 13 opens the above-mentioned servo loop by switching its switch to SW2-side, so that the signal from the defect processor 4 is allowed to be outputted. Moreover, the selector 13 continues holding the selection of the side of SW2, while having received the defect-detected signal 55 (during an interval of time of defect detection).

The memory 18 memorizes a drive signal (sampled data), which is an error signal not only sampled by predetermined sampling intervals by the A/D-converter 11 but also compensated by the compensator 12. The memory 18 has a FIFO (First-In Fast-Out) memory or FILO (First-In Last-Out) memory of a predetermined memory length. The memory 18 memorizes drive values and updates them in sequence until being instructed to stop it from the timing generator 19. On receiving a defect (DFCT)-detected signal from the defect detector 17, the timing generator 19 will give reproduction instructions to the memory 18. At the time when the memory 18 receives these reproduction instructions, the memory 18 has memorized the sample data of a drive signal obtained during a predetermined interval of time equivalent to a detection delay of a defect depending on the defect detector 17. Compensating with the compensator 12 a pseudo error signal of a horn-shape as shown in FIG. 3(C) generates the sample data. The sample data are outputted from the memory 18 as the pseudo drive signal in response to reproduction instructions.

The timing generator 19 also specifies the addresses of the sample data to reproduce, when giving reproduction instructions to the memory 18. This specification causes the memory 18 to transit from its memorization mode to its reproduction mode, so that the pseudo drive signal is reproduced with the specified addresses. The LPF 20 extracts only a low-frequency band component of the drive signal outputted from the compensator 12, and proper drive values are obtained. Accordingly, a reference signal is generated and is outputted to both of the calculator 21 and the adder 22.

Figure 13:
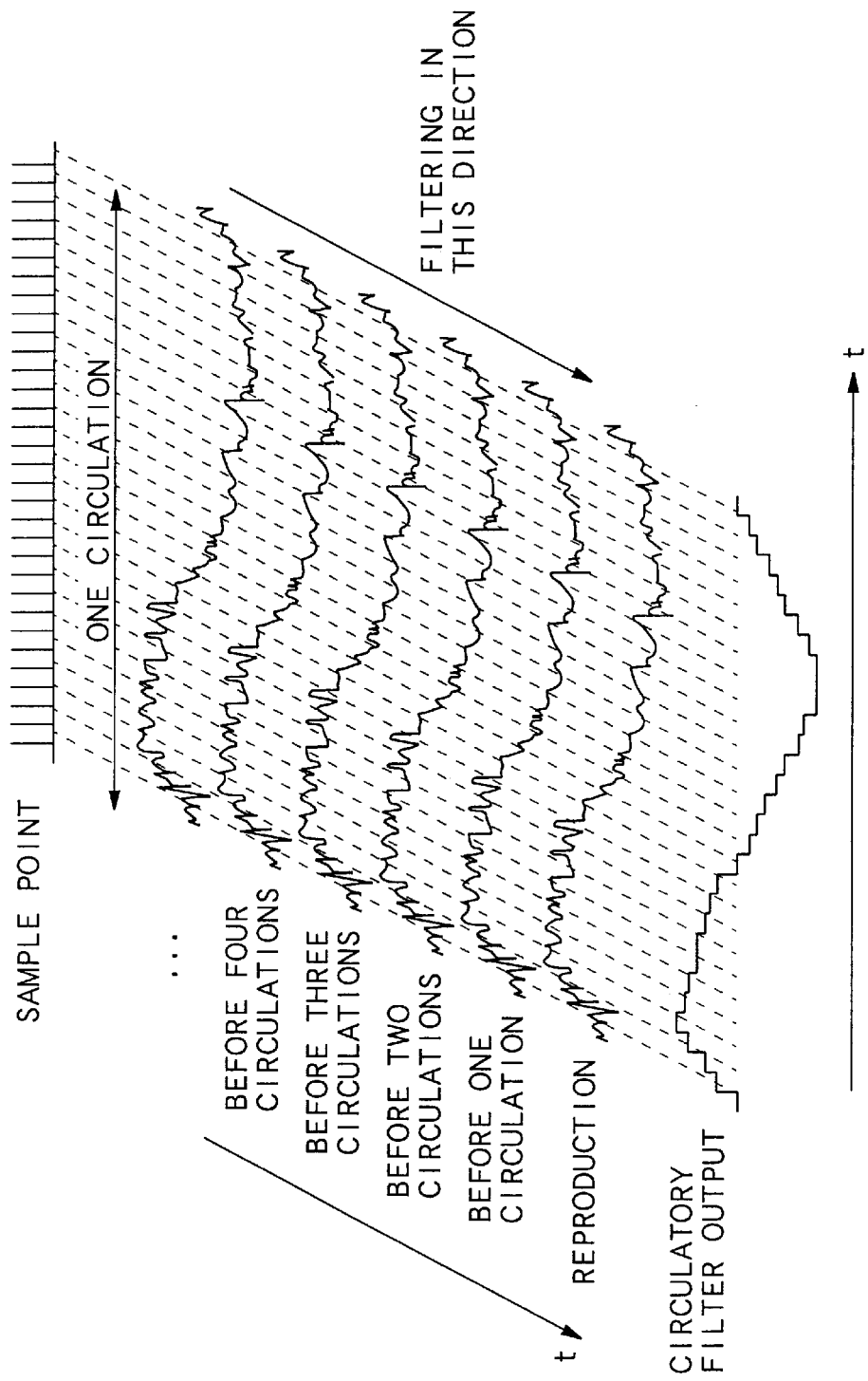
FIG. 13 shows predetermined times of circulation of waveforms outputted a circulatory filter.
Figure 14:
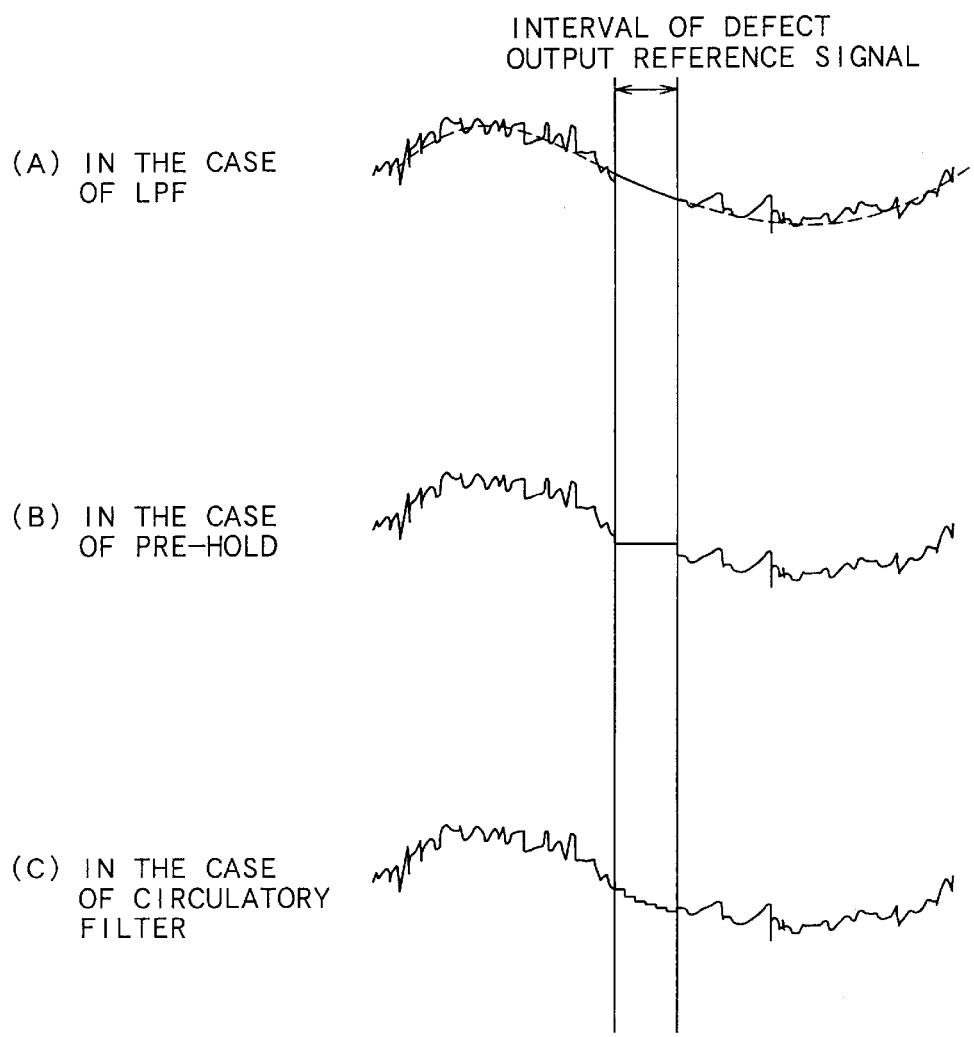
FIGS. 14(A) to 14(C) show outputted waveforms of a reference signal, which are from an LPF, pre-holding processing, and the circulatory filter, respectively.

In stead of the LPF 20, a circulatory filter may be used which outputs only the signal that is synchronized with rotation of an optical disc. The circulatory filter calculates an average (i.e., filtering) at each of the sample points of a predetermined number obtained while an optical disc rotates one time, over a predetermined number of cycles, but not during the same cycle. The number of predetermined cycles is four cycles, for example, as shown in FIG. 13. Hence, signal components that are synchronized with rotation of the optical disc can be extracted. If there is no large change (disturbance) in the drive system of an optical disc, the output of the circulatory filter will provides the almost same locus. That is, prediction will be made about its filter output, and signals with more high precision are acquired compared with a substituted signal acquired by a pre-hold or an LPF other than the circulatory filter. The output waves of the reference signals based on the LPF, based on the pre-hold, and based on the circulatory filter are compared with each other in FIGS. 14(A) to 14(C), respectively. The reference signal made by the circulatory filter shown in FIG. 14(C) is nearer to a drive signal (or error signal) obtained with no defect, compared to that made by the LPF as shown in FIG. 14(A) and that made by a pre-hold as shown in FIG. 14(B).

Figure 4A:
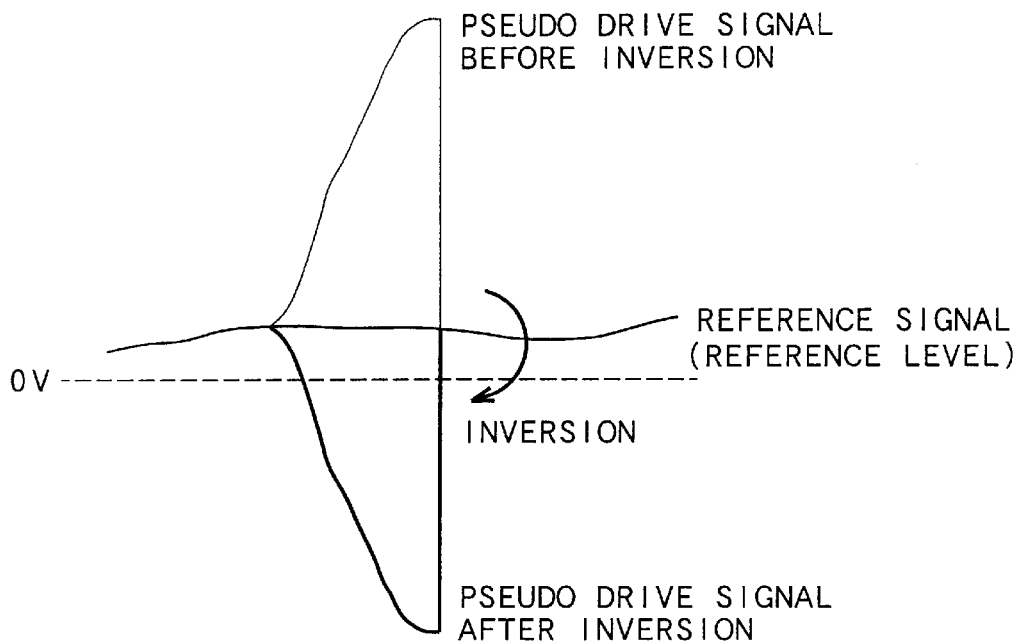
FIGS. 4(A) and 4(B) illustrate the inversion of pseudo drive signals reproduced from a memory.
Figure 4B:
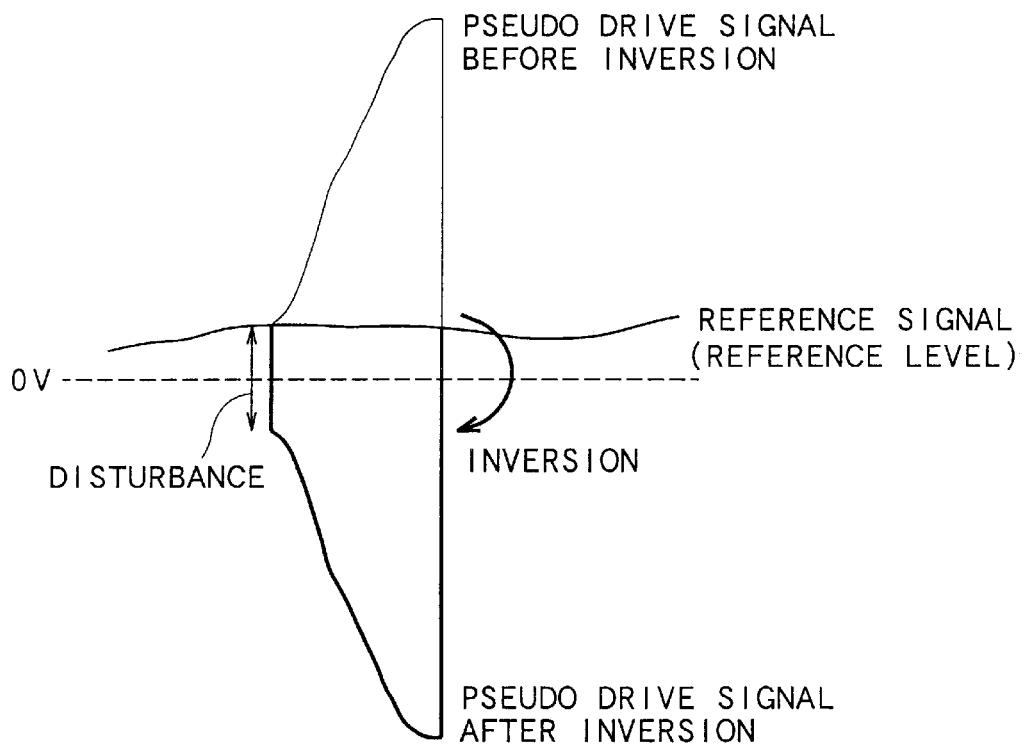

The calculator 21 inverts (folds back) the polarity of the pseudo drive signal to generate a cancel signal for negating the influence of a pseudo drive signal. As shown in FIG. 4(A), this inversion is not performed on the basis of a zero volts, but is performed on the basis of the voltage level of the reference signal outputted from the LPF 20. That is, the polarity is inverted about the amplitude of the pseudo drive signal with the reference signal regarded to a zero level. The adder 22 adds the cancel signal to the reference signal and output its added result. Thus, immediately after outputting the pseudo drive signal, a cancel signal whose wave area is the same as the pseudo drive signal, but its polarity is opposite to the pseudo drive signal, is sent to both D/A converter 14 and driver 15 through the selector 13. The reason why the inversion is made based on the reference signal in the calculator 21 is to prevent disturbances from being caused. The drive signal is slightly shifted from the zero volts in order to sustain an adequate position of the optical pickup 1, though the shifted amount is very near to the zero volts. Thus, if the inversion is made about the zero volts as shown in FIG. 4(B), a disturbance is brought about, influencing servo operations. Thus, the influence of an acceleration pulse by the pseudo drive signal can be cancelled with correction using the cancel signal. And, a relative position (the relative position between a signal surface and a focus position, i.e., the relative position between trucks and a beam) is prevented from being shifted gradually during the subsequent defect detection. Moreover, only the reference signal from the LPF 20 is outputted through the selector 13 during the subsequent defect detection after outputting the pseudo drive signal.

A selector may be used instead of using the above-mentioned adder 22. That is, the cancel signal from the calculator 21 and the reference signal from the LPF 20 may selectively be outputted by adequately switching the selector based on a switching signal from the timing generator 19. For example, if the timing generator 19 receives a defect (DFCT)-detected signal, a switch setting signal (signal shown by a reference 50 in FIG. 1) is outputted to the side to which the cancel signal is outputted from a calculator 21. After this, a predetermined number of times are counted, the switch setting signal is outputted to the side to which the reference signal is outputted from the LPF 20.

Figure 5:
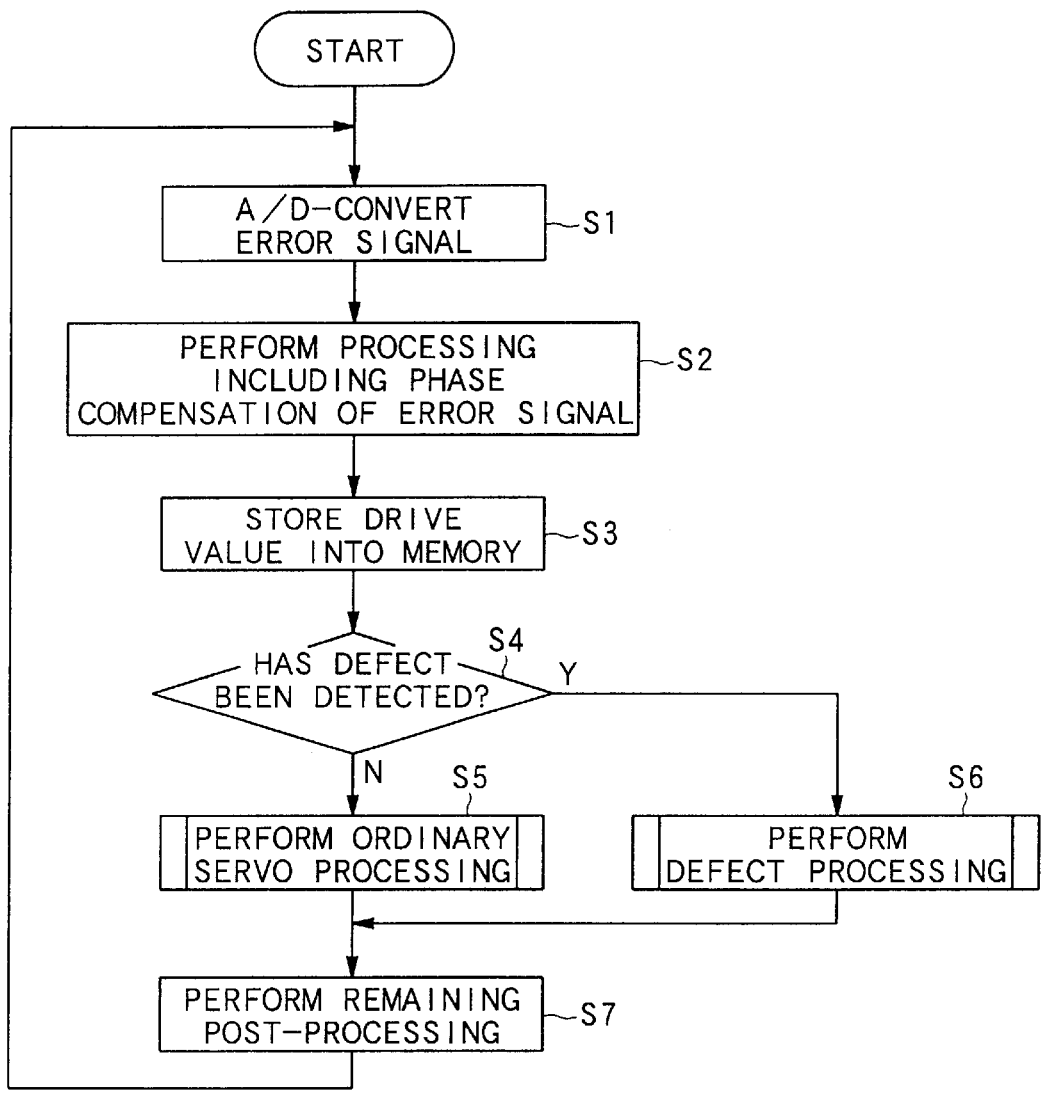
FIG. 5 is a flowchart showing the operation of the servo control apparatus in the embodiment.
Figure 6:
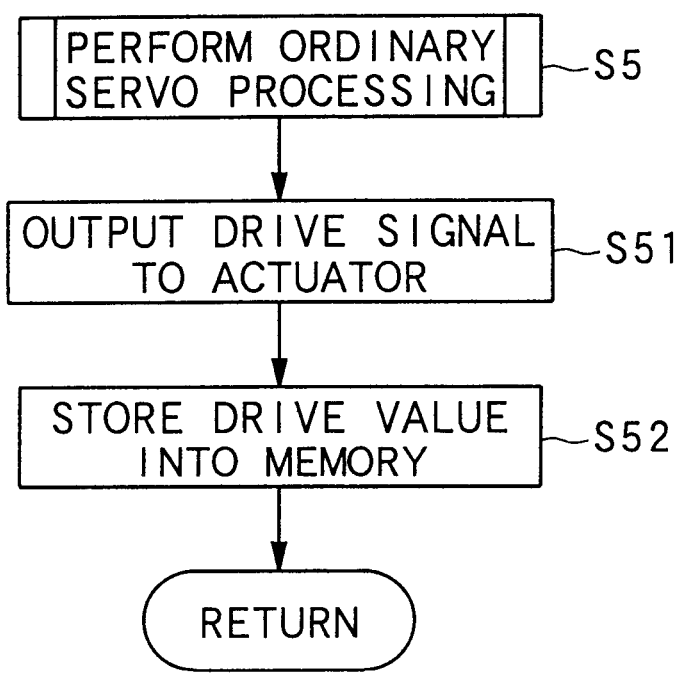
FIG. 6 details a flowchart showing an ordinary servo processing employed by the flowchart of FIG. 5.

The operation of the servo control apparatus 100 of the present embodiment will now be explained based on the flowcharts of FIGS. 5 to 7.

When an optical disc is loaded, and the servo control apparatus 100 starts, based on the signal outputted from the optical pickup 1, an RF signal and an error signal will be generated in the signal producer 2. The RF signal is outputted to the defect detector 17 and the error signal is outputted through the adder 10 to the A/D converter 11, respectively. The error signal outputted to the A/D converter 11 is sampled at predetermined sampling intervals, and is outputted to the compensator 12 (Step S1). The compensator 12 performs predetermined processing including phase compensation and low-frequency band boost addition to the sampled error signal, and outputs it as a drive signal (Step S2). Drive values outputted from the compensator 12 are memorized into the memory 18 so as to be updated manner according to a predetermined memory length of the memory 18 (Step S3).

It is then determined in the defect detector 17 whether or not a defect exists in the RF signal (Step S4). When there is no defect in the RF signal, an ordinary servo processing shown in FIG. 6 is performed (Step S5). That is, the drive signal outputted from the compensator 12 is sent to the actuator 5 as a drive signal, while the drive signal is fed back to the adder 10 through the selector 13 (SW1 side), the D/A converter 14, the driver 15, the actuator 5, the pickup 1 and the signal producer 2 (Step S51). This allows the optical pickup 1 to be driven and controlled so that a light beam irradiated from a luminescence source, such as a not-shown laser diode, is positioned properly on an optical disc. Moreover, the drive values outputted from the compensator 12 are memorized into the memory 18 during this drive control as they are sequentially updated (Step S52).

Figure 7:
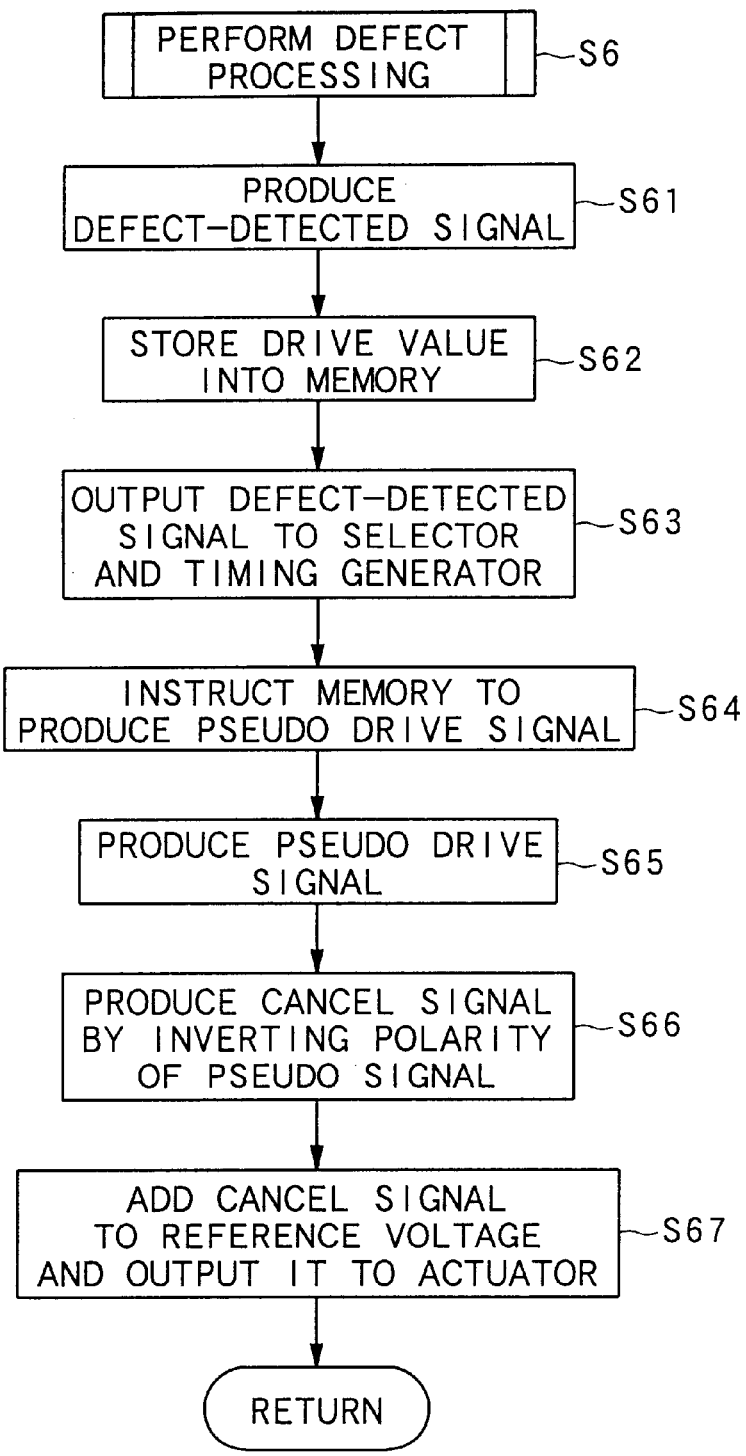
FIG. 7 details a flowchart showing a defect processing employed by the flowchart of FIG. 5.

On the other hand, when there is a defect in the RF signal, defect processing shown in FIG. 7 is performed (Step S6). That is, a defect (DFCT)-detected signal is first generated by the defect detector 17 (Step S61). In addition, drive values based on a pseudo error signal are memorized into the memory 18 until the defect detector 17 detects a defect (Step S62). Then, the generated defect (DFCT)-detected signal is outputted to the selector 13 and the timing generator 19 (Step S63). This causes the selector 13 to be switched to the SW2 side from the SW1 side, and the servo loop is opened. In this case, immediately before the servo loop is opened, the pseudo drive signal corresponding to the drive values memorized in the memory 18 is sent to the driver 15 via the selector 13 (SW1 side) and the D/A converter 14 for a predetermined interval of time corresponding to a detection delay of a defect dependent on the defect detector 17. On receiving the defect (DFCT)-detected signal, the timing generator 19 specifies the addresses of the sample data of the drive signal to be reproduced, while giving reproduction instructions to the memory 18 (Step S64). This causes the memory 18 to transfer from its memorization mode to its reproduction mode, thus reproducing the pseudo drive signal memorized immediately before detecting the defect (Step S65).

Figure 8A:
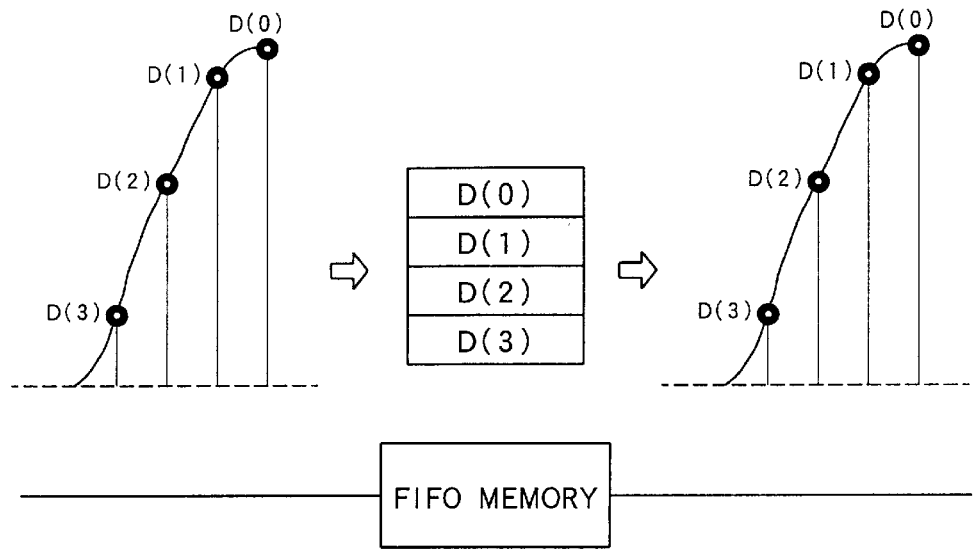
FIGS. 8(A) and 8(B) illustrate a pseudo drive signal outputted from a FIFO memory or FILO memory, respectively.
Figure 8B:
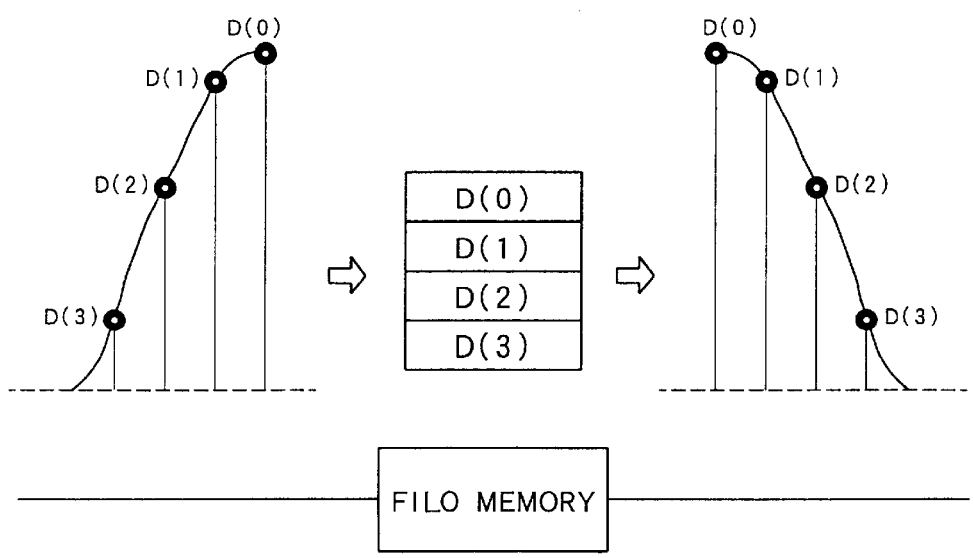
Figure 9:
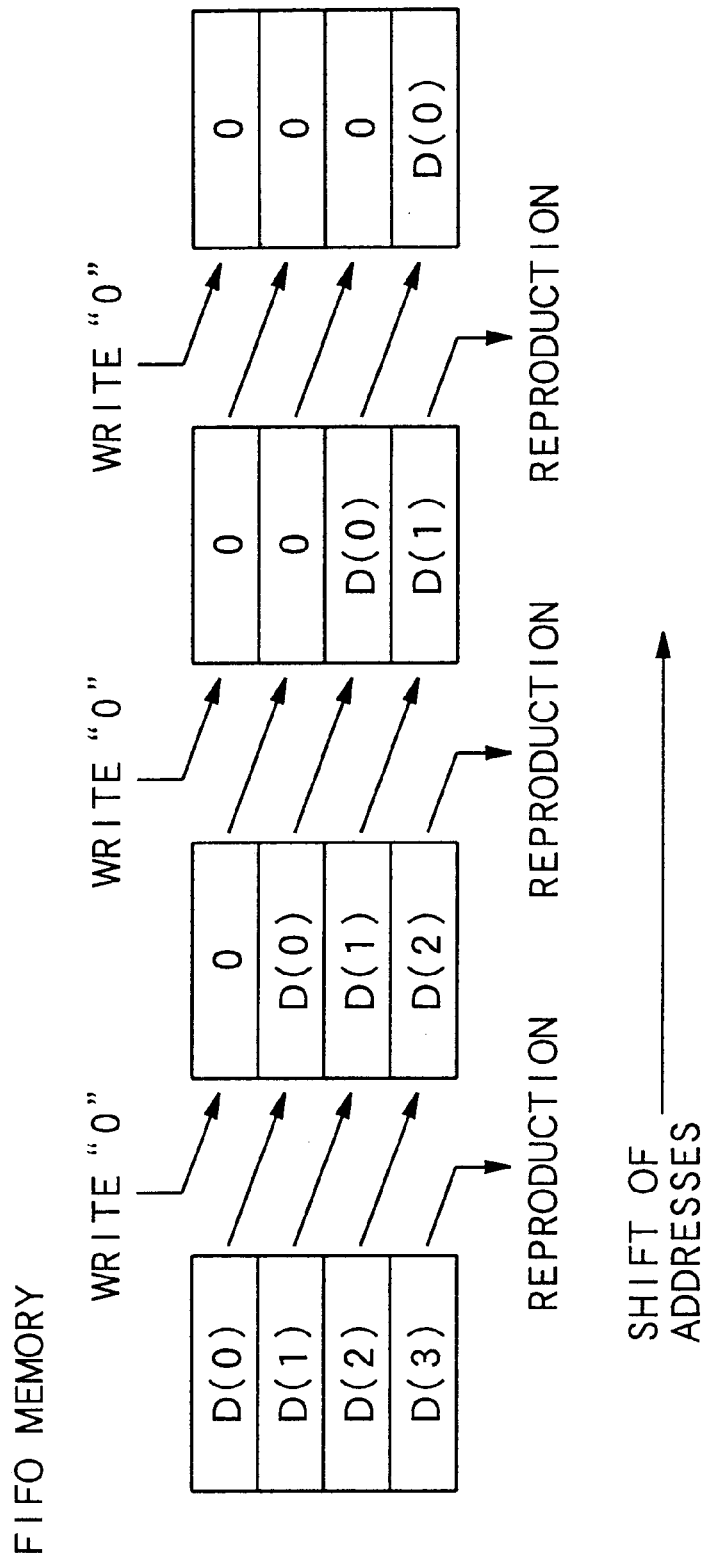
FIG. 9 shows address shifts in a reproduction mode of the FIFO memory.

For example, when the memory 18 is a FIFO memory, as shown in FIG. 8(A), reproduction is made sequentially from the sample data memorized first. On the other hand, when the memory 18 is a FILO memory, as shown in FIG. 8(B), reproduction is made sequentially from the sample data memorized at the end. Thus, if the FIFO memory or FILO memory is used, the pseudo drive signal is reproducible in a form as it is. Thus the cancel signal which negates the influence of a pseudo drive signal in a higher precision can be produced. Although such reproduction is performed by shifting the address of the memory 18, writing "0" in the address of the memory 18 may be done as shown in FIG. (9), for example, whenever the sample data is reproduced. As a result, after fixed time passes, the correction on the cancel signal can be completed automatically.

Figure 10:
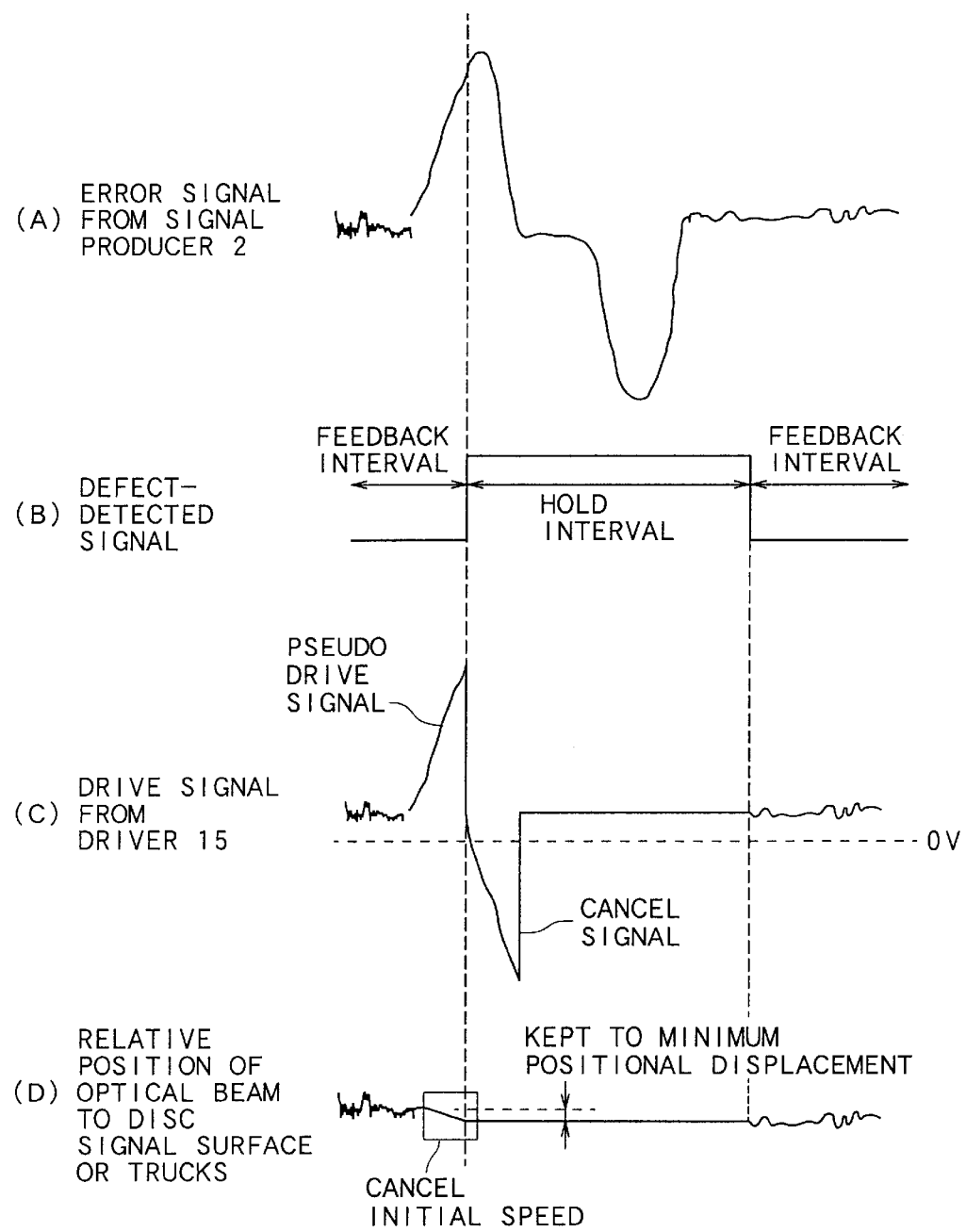
FIGS. 10(A) to 10(D) show the waveforms of various signals in the servo control apparatus in the occurrence of a defect.

Then, in the calculator 21, the polarity of the pseudo drive signal reproduced from the memory 18 on the basis of the voltage level of the reference signal outputted from LPF20 is inverted (folds back) to generate a cancel signal, and this cancel signal is outputted to the adder 22 (Step S66). In the adder 22, the cancel signal outputted from the calculator 21 is added to the reference signal outputted from the LPF 20, and this added signal is sent to the actuator 5 through the selector 13 and others (Step S67). Thus, the cancel signal that is able to negate the influence of this pseudo drive signal is provided by way of the selector 13 and others to the actuator 5 immediately after applying the pseudo drive signal to the actuator 5, immediately before detecting a defect, as shown in FIG. 10(C). Accordingly, as shown in FIG. 10(D), the power of an accelerating direction of the pseudo drive signal added to the optical pickup 1 is negated by the power of the decelerating direction of the cancel signal. Hence a stable servo operation is realized. That is, it can be prevented certainly that a light beam shifts from a target position of an optical disc.

In addition, in the above-mentioned embodiment, the sample data of the pseudo drive signal memorized by the memory 18 are used as they are and inverted in polarity, thereby a cancel signal being generated. The cancel signal is not limited to such a generation method, and may be generated as below.

That is, the calculator 21 may read sample data from the memory 18, integrate them, and form a pulse signal of inverted polarities which has an area equal to this integrated value, and may output this as a cancel signal. Thereby, the cancellation effect almost equivalent to the cancel signal given in the above-mentions embodiment can be acquired.

Figure 11A:
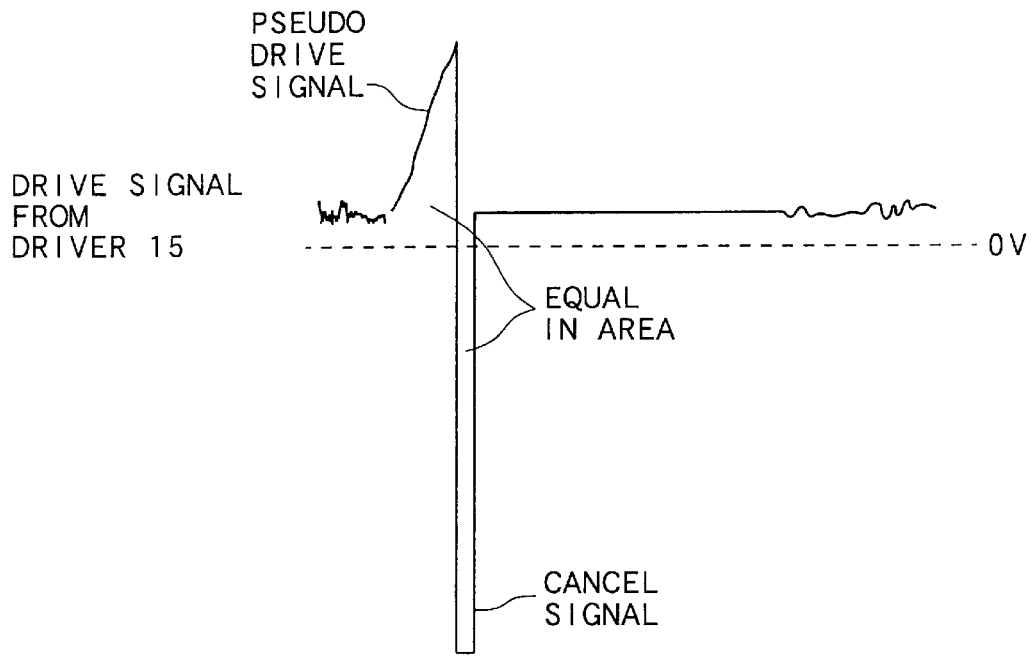
FIGS. 11(A) and 11(B) exemplify a situation in which sample data of a pseudo drive signal are integrated to produce a cancel signal.
Figure 11B:
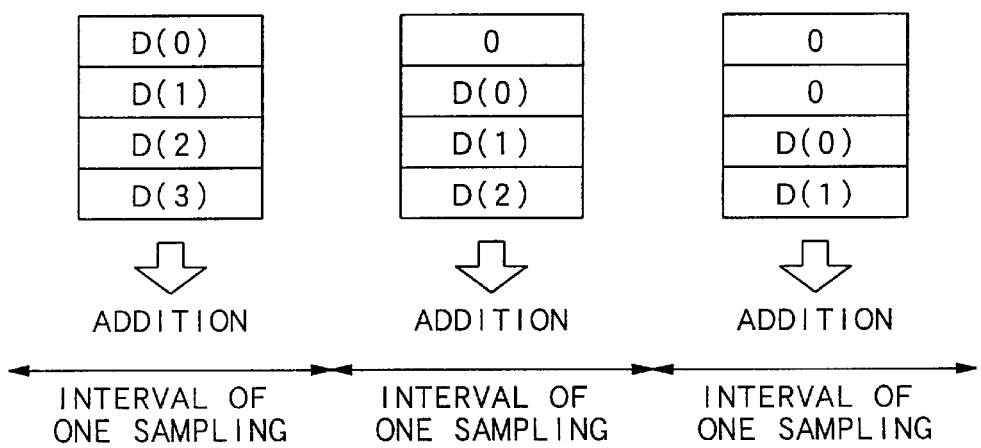

Furthermore, in generation by this integral, the time width of this pulse signal may be set to a small value as much as possible from the time width of a pseudo drive signal. For example, as shown in FIG. 11(A), by the time width of 1 to 2 clocks, the pulse signal of which polarity is inverted to have an area equal to the integral value of a pseudo drive signal may be generated, and this may be outputted as a cancel signal. The calculation method in this case is explained with reference to FIG. 11(B). For example, if there are sample data memorized by the memory 18 by four samples, the calculator 21 integrates (adds) sequentially the sample data for four samples at intervals of one sampling before detecting a defection. When a defect is detected, the calculator 21 outputs the integrated data immediately before the detection of the defect, as a pulsed cancel signal of which polarity is inverted (as to a voltage level of the reference level). Thus, this cancel signal can cancel the influence of a pseudo drive signal in a higher precision rather than the cancel signal given in the embodiment mentioned above.

In addition, in the above-mentioned embodiment, since the polarity of the pseudo drive signal supplied to the driver 15 just before a defect-detected signal becomes high-level was positive, the polarity of a cancel signal was made negative. However, in cases where the pseudo drive signal is negative in polarity, its cancel signal may be positive in polarity.

Figure 12:
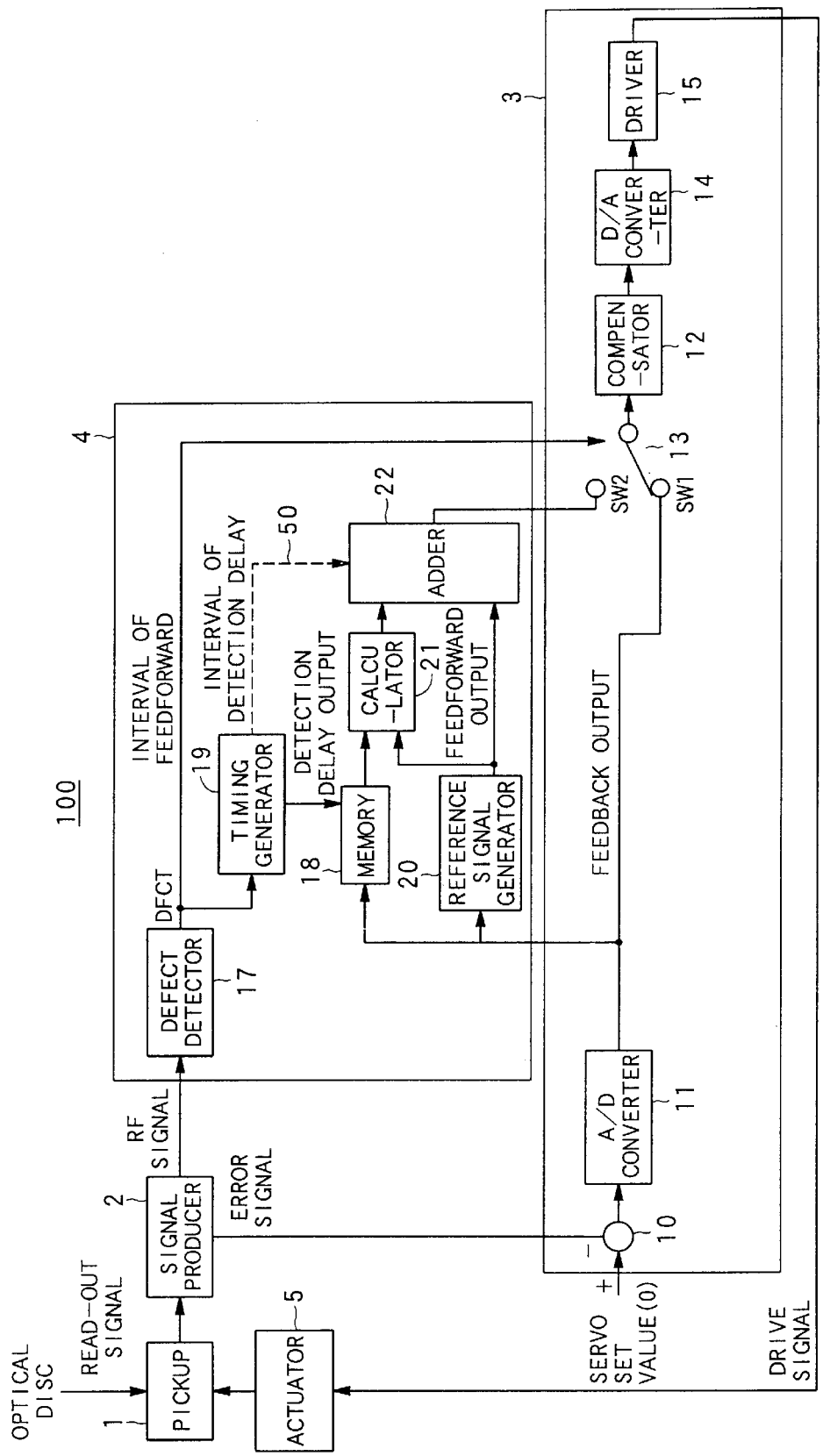
FIG. 12 exemplifies an outlined configuration of a servo control apparatus according to another embodiment of the present invention.

Moreover, in the above-mentioned embodiment, the drive signal outputted form the compensator 12, which phase-compensates an error signal treated as the control signal, is received by the defect processor 4, wherein the cancel signal is produced. As shown in FIG. 12, another embodiment is available. In the example of FIG. 12, an input signal to the compensator, i.e., an error signal is supplied to the defect processor 4, the cancel signal is produced, and supplied as an input signal to the compensator 12 selectively according to the defect-detected signal. Also, by this composition, the operation and effects equivalent to the embodiment of FIG. 1 is acquired.

Figure 15:
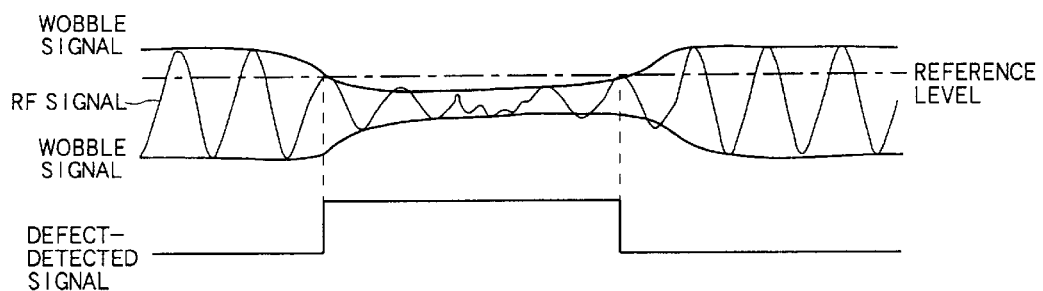
FIG. 15 shows a modification of defect detection of the present invention.
Figure 16:
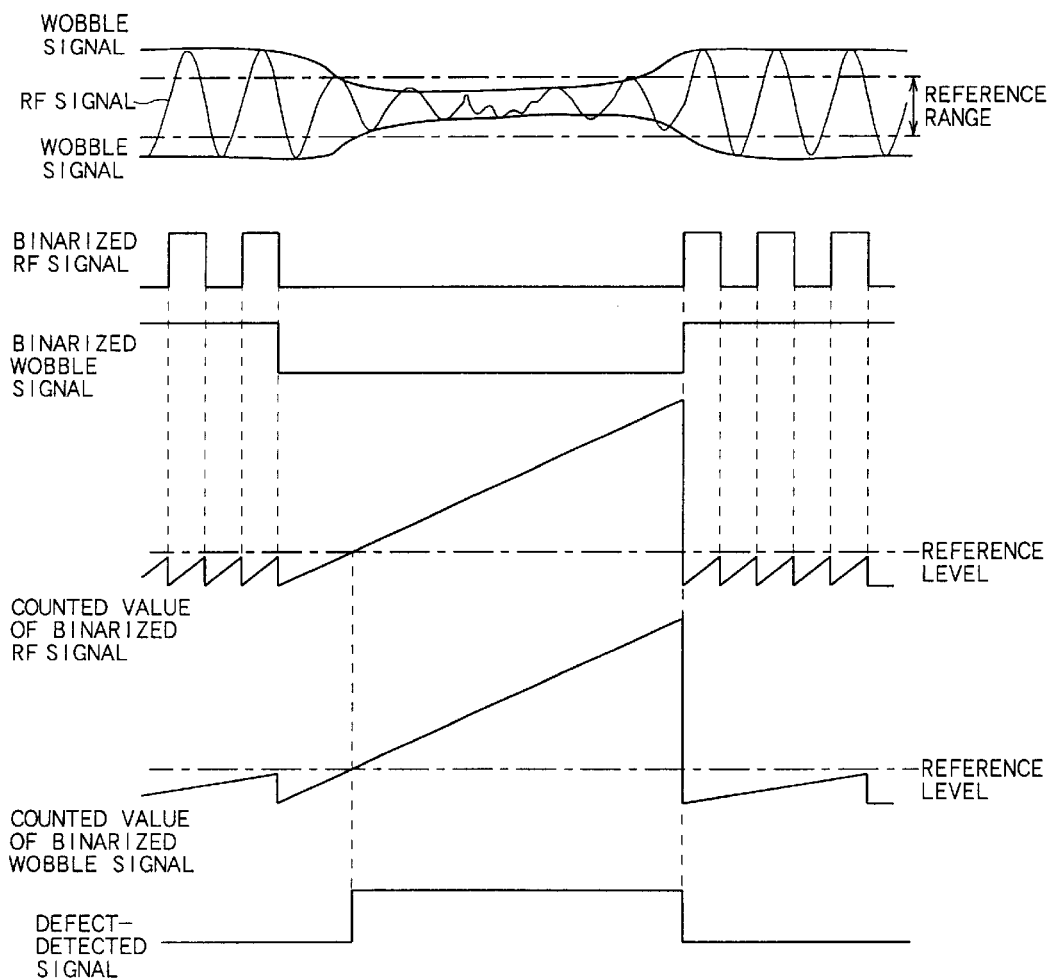
FIG. 16 shown another modification of defect detection of the present invention.

In the above-mentioned embodiment of the present invention, the defect detector 17 is described as an example of the defect detecting device. Detection of defect may be carried out by detecting a phenomenon in which the level of a wobble signal decreases less than the reference level as shown in FIG. 15. Alternatively, detection of defect may be carried out by binarizing portions in which the amplitude of an RF signal or a wobble signal that is of an analog signal exceeds a prescribed reference range, counting a period of time when the binarized signal (i.e., the binarized RF signal or the binarized wobble signal) has a constant level and determining occurrence of defect when the counted value exceeds the reference level, as shown in FIG. 16.

As explained above, even if a pseudo error signal because of a defect detection delay is added to the actuator, the power of an accelerating direction caused by the pseudo error signal can be canceled by the force in the decelerating direction generated by the cancel signal. Therefore, a light beam can be prevented from shifting from a target position of an optical disc, and the stable servo control can be performed.

The entire disclosure of Japanese Patent Application No. 2000-188867 filed on Jun. 23, 2000 including the specification, claims, drawings and summary is incorporated herein by reference in its entirety.

What is claimed is:

1. A servo control apparatus for an optical disc driver, in which a control signal assigned to a displacement amount of an optical beam from a target value is used to drive an actuator for controlling a position of the optical beam on an optical disc, comprising:

a defect detecting device for detecting a defect on the basis of reflected light of the optical beam from the optical disc;

a storing device for storing sample data of the control signal obtained during a predetermined interval corresponding to a detection delay of the defect due to at least the defect detecting device on the basis of sample values of the control signal inputted at predetermined sampling intervals;

a cancel signal producing device for producing a cancel signal to cancel influences of the control signal obtained during the predetermined interval on the basis of the stored sample data; and an outputting device for outputting the cancel signal as the control signal immediately after the detection of the defect.

2. The servo control apparatus of claim 1, wherein the cancel signal is opposite in polarity to the control signal stored in the storing device as the sample data and is a pulse signal equal to an integrated value of the sample data.

3. The servo control apparatus of claim 1, wherein the cancel signal is smaller in a temporal width than the control signal stored as the sample data in the storing device.

4. The servo control apparatus of claim 2, wherein the cancel signal is smaller in a temporal width than the control signal stored as the sample data in the storing device.

5. The servo control apparatus of claim 1, wherein the storing device has a FIFO memory and is configured so as to output the sample data using a function of the FIFO memory, and the cancel signal producing device is configured so as to produce the cancel signal by inverting polarities of the outputted sample data.

6. The servo control apparatus of claim 1, wherein the storing device has a FILO memory and is configured so as to output the sample data using a function of the FILO memory, and the cancel signal producing device is configured so as to produce the cancel signal by inverting polarities of the outputted sample data.

7. The servo control apparatus of claim 5, further comprising a reference signal producing device for producing a reference signal by extracting only a lower frequency component of the control signal, wherein the cancel signal producing device is configured so as to invert the polarities of the sample data outputted from the storing device by using as a reference a voltage level of the reference signal produced by the reference signal producing device.

8. The servo control apparatus of claim 6, further comprising a reference signal producing device for producing a reference signal by extracting only a lower frequency component of the control signal, wherein the cancel signal producing device is configured so as to invert the polarities of the sample data outputted from the storing device by using as a reference a voltage level of the reference signal produced by the reference signal producing device.

9. The servo control apparatus of claim 1, wherein the control signal is an error signal produced from the reflected light.

10. The servo control apparatus of claim 1, wherein the control signal is a drive signal to the actuator.

* * * * *